United States Patent [19]

Matsushita et al.

[11] Patent Number: 4,873,053
[45] Date of Patent: Oct. 10, 1989

[54] METHOD FOR MANUFACTURING A METAL BORIDE CERAMIC MATERIAL

[75] Inventors: Junichi Matsushita; Hajime Saito, both of Nagoya; Hideo Nagashima, Tokyo, all of Japan

[73] Assignees: STK Ceramics Laboratory Corp.; Toshiba Ceramics Co., Ltd., both of Japan

[21] Appl. No.: 155,604

[22] Filed: Feb. 12, 1988

[30] Foreign Application Priority Data

Feb. 20, 1987 [JP] Japan .................................. 62-35475
Feb. 20, 1987 [JP] Japan .................................. 62-35476

[51] Int. Cl.⁴ .............................................. G22F 1/00
[52] U.S. Cl. .......................................... 419/11; 75/238; 75/243; 75/244; 264/56; 264/125; 419/12; 419/14; 419/16; 419/18; 501/92; 501/96; 501/98

[58] Field of Search ...................... 419/12, 11, 14, 16, 419/18; 75/244, 238, 243; 501/96, 98, 92; 264/56, 125

[56] References Cited

U.S. PATENT DOCUMENTS 2,974,040 3/1961 Fisher et al. .......................... 419/12
3,843,375 10/1974 Murata .................................. 75/238
3,859,399 1/1975 Bailey et al. .......................... 419/16

*Primary Examiner*—Stephen J. Lechert, Jr.
*Attorney, Agent, or Firm*—Lorusso & Loud

[57] ABSTRACT

A method for manufacturing a metal boride ceramic material, includes mixing metal boride powder with 1-20 wt. % metal powder and 0.1-10 wt. % carbon powder, shaping the mixture and firing it. Alternatively, the metal boride powder may be mixed with 0.1-89 wt. % metal carbide powder thereby make a mixture, followed by shaping the mixture and firing it.

20 Claims, 6 Drawing Sheets

METHOD FOR MANUFACTURING A METAL BORIDE CERAMIC MATERIAL

BACKGROUND OF THE INVENTION

This invention relates to a method for manufacturing a metal boride ceramic material.

Conventional metal boride ceramic materials are manufactured by a hot pressing method, for example, as disclosed in Japanese Patent Laying-Open Nos. 52-106306 and 54-90314.

The conventional metal boride ceramic materials have poor density and low strength even if they are manufactured by hot pressing and sintered.

SUMMARY OF THE INVENTION

The object of this invention is to provide a method for manufacturing a metal boride ceramic material of high density, high strength and high hardness.

According to the method of this invention a metal boride ceramic material is produced by: mixing (1) metal boride powder with (2) 1–20 wt. % of various metal powders and (3) 0.1–10 wt. % of carbon powder; shaping the mixture; and firing it, wherein the total of the three fractions is 100 wt. %. One or more types of metal boride powder are included as the major component and 1–20 wt. % of one or more types metal powder functions as a binder in the basic structure of the end product.

Why the preferred range for the metal powder is between 1 and 20 wt. % is explained as follows:

The metal particles can improve the wettability of the metal boride powder. The boron in the metal boride, which is reduced by the carbon, combines with the metal particles so as to form a rigid or strong grain boundary phase within a metal boride matrix. If the metal powder is less than 1 wt. %, wettability is such that a suitable microstructure cannot be formed and, as a combination of the metal and the boron in the metal boride is too small in volume a strong grain boundary phase cannot be formed in the matrix. On the contrary, if the metal powder is more than 20 wt. %, the wettability is reduced because as a combination of the metal and the boron in the metal boride is too large a volume within the matrix and the strength decreases.

The amount of carbon powder is also important. Carbon can further improve wettability of the metal boride powder and acts to produce a M-C phase when it reacts with M wherein M denotes a metal. Also, carbon reduces the metal boride and combines with the metal (M') of the metal boride whereby a M'-C phase is formed as a strong grain boundary phase. If carbon powder is less than 0.1 wt. %, the wettability cannot be improved because the carbon powder is not enough to reduce the metal boride and to produce the M-C and/or M'-C phases. If carbon is more than 10 wt. %, the wettability is inhibited. Thus, excess carbon decreases the strength of the fired body.

In another embodiment of the invention, the metal boride ceramic material is made by: mixing (1) metal boride powder with (2) 0.1–89 wt. % metal carbide powder mixture; shaping the; and firing it, wherein the total of the two components is 100 wt. %.

Preferably, the metal boride is $MB_2$ type boride, or a $M_2B_5$, $M_2B$, $M_5B_3$, $M_3B_2$, $MB$, $M_3B_4$ or $MB_{12}$ type boride which convert into $MB_2$ upon being heated to an elevated temperature. For example, the $MB_2$ type boride is one or more selected from a group consisting of $TiB_2$, $ZrB_2$, $VB_2$, $NbB_2$, $TaB_2$, $MoB_2$, $MnB_2$, $HfB_2$ and $AlB_2$. The $M_2B_5$, $M_2B$, $M_5B_3$, $M_3B_2$, $MB$, $M_3B_4$ and $MB_{12}$ type boride is one or more selected from a group consisting of $Ti_2B$, $Ta_2B$, $Cr_2B$, $Mo_2B$, $W_2B$, $Cr_3B_3$, $Nb_3B_2$, $Ta_3B_2$, $TiB$, $NbB$, $TaB$, $CrB$, $MoB$, $WB$, $Nb_3B_4$, $Ta_3B_4$, $Cr_3B_4$, $Ti_2B_5$, $Mo_2B_5$, $W_2B_5$, $ZrB_{12}$ and $MoB_{12}$.

It is also preferably that the metal powder is one or more selected from a group consisting of Cr, Ni, Ti, Mo, Si, Fe and Ta.

The mixture may be fired by a pressureless or a pressure sintering method. In embodiments using the metal carbide powder, the mixture is preferably fired to near the melting point of the metal carbide powder.

Preferably, the metal carbide powder is one or more selected from elements of 3, 4a, 5a, 6a and 8 groups in a periodic table. For example, the metal carbide powder may be chromium carbide, molybdenum carbide, tungsten carbide, nickel carbide or iron carbide and is preferably chromium carbide, molybdenum carbide or tungsten carbide.

Why the preferred range for the metal carbide powder is 0.1 and 89 wt. % is as follows:

The metal carbide is decomposed into metal and carbon when it is fired, particularly upon firing to near the melting point of the metal carbide. At that time, the metal particles derived from the metal carbide can improve the wettability of the metal boride powder. The boron in the metal boride which is reduced by the carbon in the metal carbide combines with the metal particles to form a strong grain boundary phase within a metal boride matrix.

The carbon in the metal carbide further improve wettability of the metal powder and acts to produce a M-C phase when it reacts M wherein M denotes a metal. Also, the carbon reduces the metal boride and combines with the metal (M') in the metal boride whereby a M'-C phase is formed as a strong grain boundary phase. If the metal carbide is less than 0.1 wt. %, the wettability cannot be improved, and a suitable microstructure cannot be formed because the combination of boron and metal in the metal boride is too small in volume and no rigid or strong grain boundary phase can be formed. At less than 0.1 wt. % the carbon powder is insufficient to reduce the metal boride and to produce the M-C and/or M'-C phases. On the contrary, if the metal carbide is more than 89 wt. %, the wettability is inhibited. Thus, an excess of remaining carbon decreases the strength of the fired body.

BRIEF DESCRIPTION OF THE DRAWINGS

FIG. 2 is a graphic view showing the relationship between amount of Cr added and bending strength in the case of a sintered body consisting of 99 wt. % $TiB_2$ and 1 wt. % C of;

EXAMPLE (1)

1 wt. % C of 1 wt. % was added to 99 wt. % $TiB_2$ and further 0-14 wt. % Cr is added. The mixture was fired by pressureless sintering at 1,900° C. for one hour within Ar. The test results for such a sintered body are shown in Table 1 and FIGS. 1 and 2.

Figure 1:
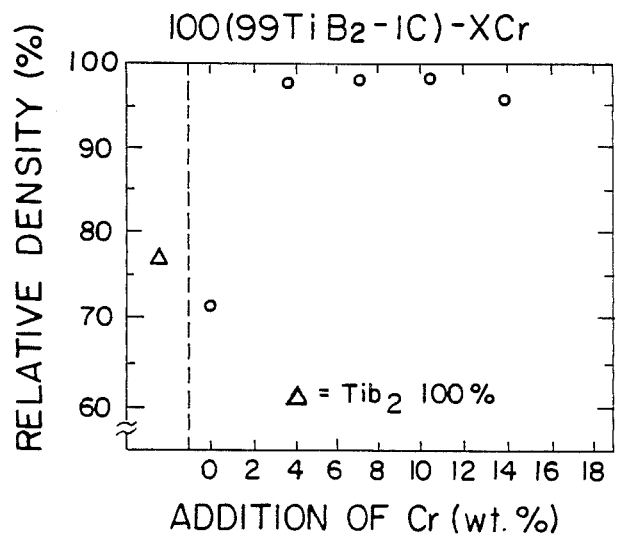
FIG. 1 is a graphic view showing the relationship between the amount of Cr added and relative density in case of a sintered body consisting of 99 wt. % $TiB_2$ and 1 wt. % C.

In FIG. 1, small circles illustrate how addition of Cr affects relative density of a sintered body which consists of 99 wt. % $TiB_2$ and 1 wt. % C, and a triangle illustrates the relative density of a sintered body which consists of 100 wt. % $TiB_2$ As shown in Table 1, the bending strength ranges between 109 MPa and 376 MPa, which is high as compared with the prior result. Also, the relative density is high.

EXAMPLE (2)

1 wt. % C of was added to 99 wt. % $TiB_2$ so as to form a mixture. After that, 7 parts Cr were added to 100 parts of the mixture and the mixture was shaped and fired by hot pressing at 1,900° C. for one hour within Ar. The experimental results for such a sintered body are shown in Table 2 and FIG. 2.

Figure 2:
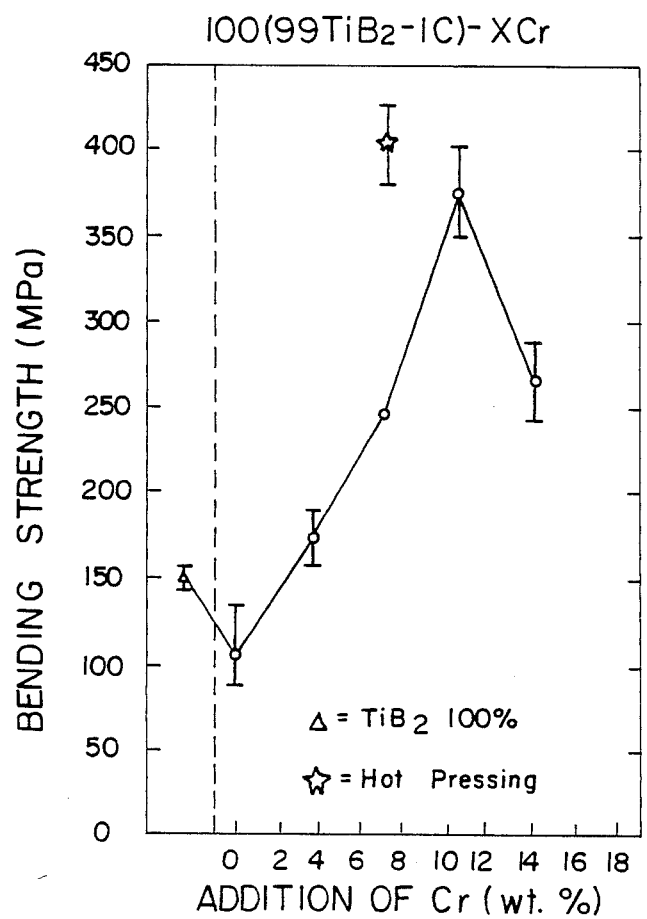

In FIG. 2, small circles illustrate how addition of Cr affects relative density of a sintered body which consists of 99 wt. % $TiB_2$ and 1 wt. % C, and a triangle illustrates the relative density of a sintered body which consists of 100 wt. % $TiB_2$. A star denotes the characteristics of fired body produced by a hot pressing at 1,900° C. for 30 minutes under 30 MPa in an Ar atmosphere.

EXAMPLE (3)

Various mixtures having weight ratios of (Cr/C) in $TiB_2$ of 7:0, 7:1, 7:1.5, and 7:2 respectively, were prepared. Each mixture was fired for pressureless sintering at 1,900 ° C. for one hour within an Ar atmosphere.

Figure 3:
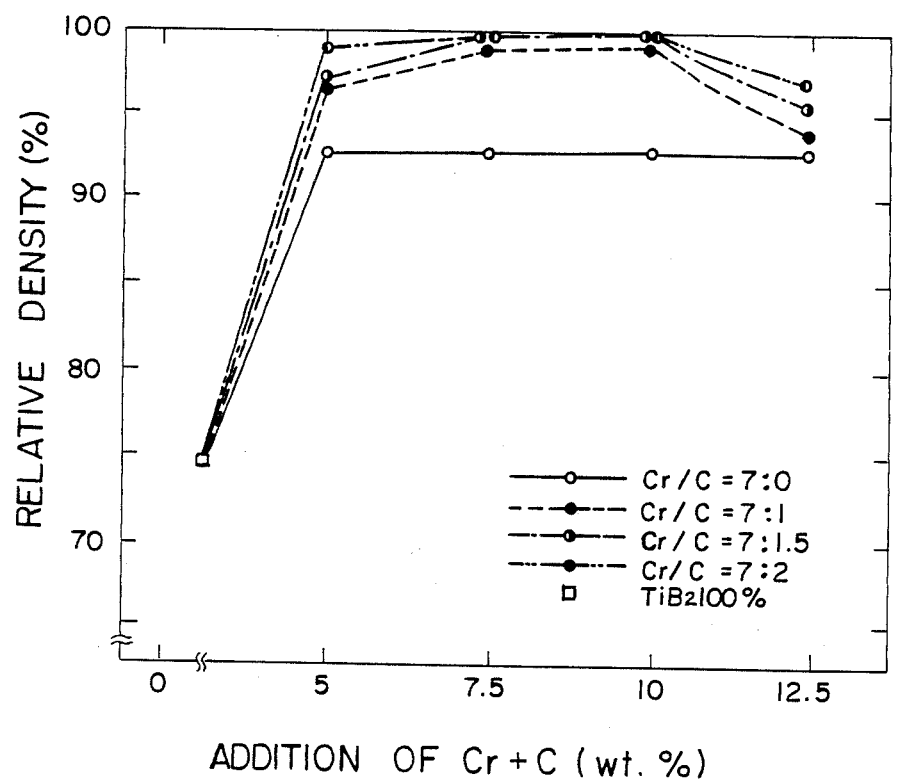
FIG. 3 is a graphic view showing relationships between amount of addition of (Cr+C) and relative density.
Figure 4:
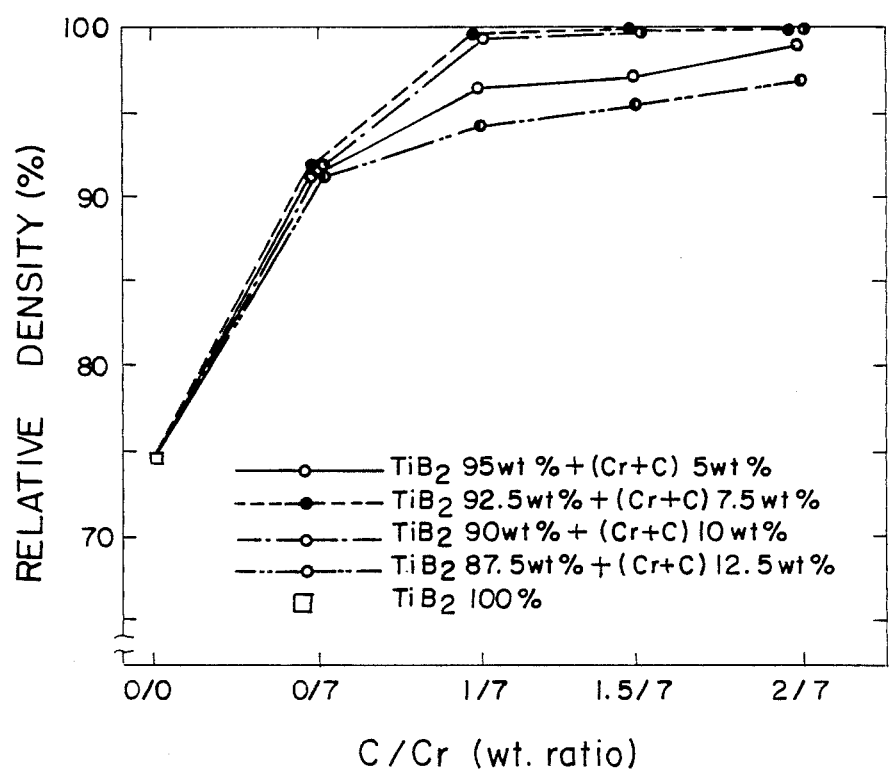
FIG. 4 is a graphic view showing relationships between the weight ratio of C/Cr and relative density.
Figure 5:
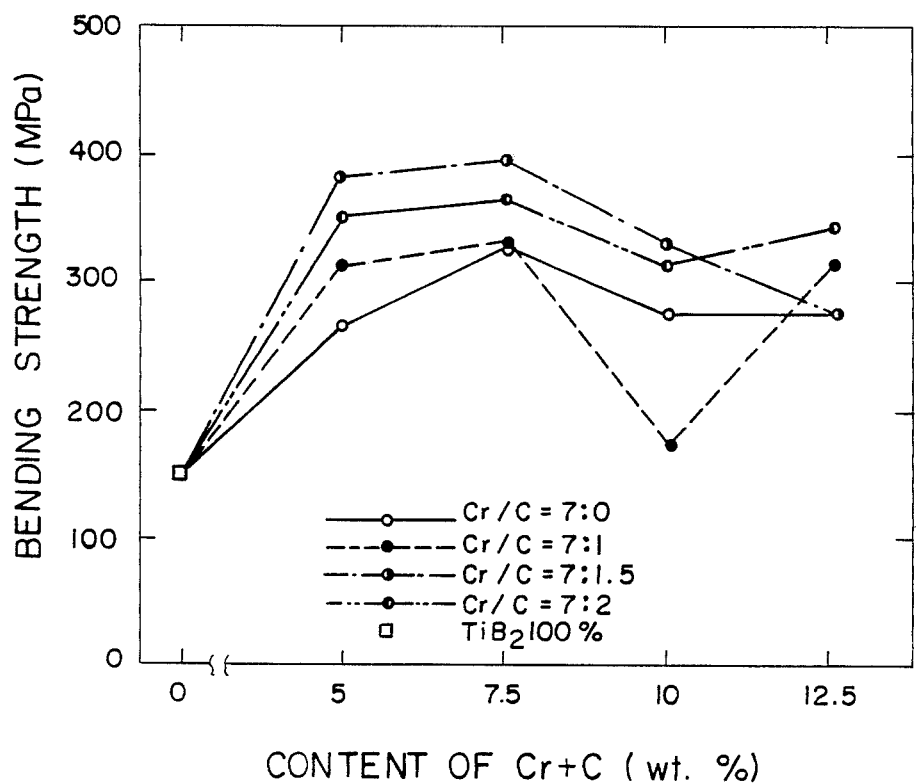
FIG. 5 is a graphic view showing relationships between amount of addition of (Cr+C) and bending strength.
Figure 6:
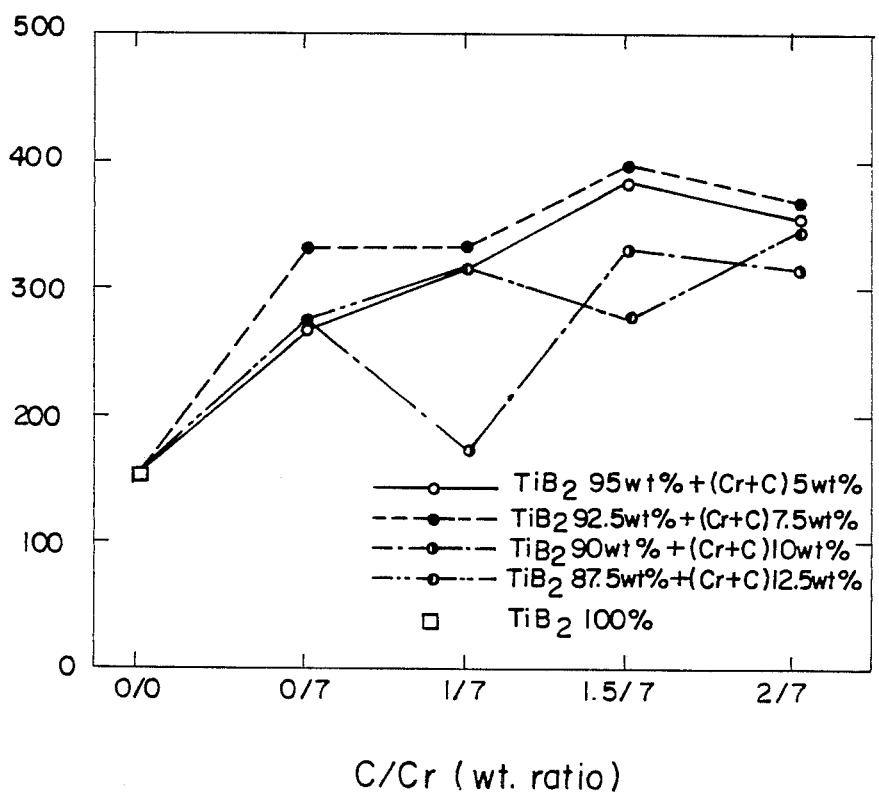
FIG. 6 is a graphic view showing relationships between the weight ratio of C/Cr and bending strength.

The experimental results are shown in Table 3 and FIGS. 3 through 6. FIG. 3 shows relationships between relative density and total amount of addition of (Cr+C). FIG. 4 shows relationships between relative density and weight ratio of C/Cr in the case where a mixture is fired at 1,900° C. for one hour within Ar atmosphere. FIG. 5 shows relationships between bending strength and total amount of addition of (Cr+C) in the case where a mixture is fired at 1,900 ° C. for one hour within an Ar atmosphere. FIG. 6 shows relationships between bending strength and weight ratio of C/Cr under the same conditions. In FIGS. 3 to 6, rectangle denote the relationship for the case where $TiB_2$ is 100 wt. %. It can be observed that the relative densities are high and the maximum bending strength is 398 MPa if the total amount of addition of (Cr+C) is 7.5 wt. % wherein the weight ratio of Cr:C is 7:1.5.

In FIGS. 4 and 5, the meanings of the various symbols are as follows:

: $TiB_2$ of 95 wt. %+(Cr+C) of 5 wt. %
: $TiB_2$ of 92.5 wt. %+(Cr+C) of 7.5 wt. %
: $TiB_2$ of 90 wt. %+(Cr+C) of 10 wt. %
: $TiB_2$ of 87.5 wt. %+(Cr+C) of 12.5 wt. %

The weight ratios of (Cr/C) in $TiB_2$ are 7:0, 7:1, 7:1.5 and 7:2, respectively in the examples shown in FIGS. 4 and 5.

| | |
|---|---|
| EXAMPLE (4) | metal boride + M + C |
| EXAMPLE (5) | metal boride + Cr + C |
| EXAMPLE (6) | $TiB_2$ + M + C |
| EXAMPLE (7) | $TiB_2$ + Cr + C |
| EXAMPLE (8) | metal boride + metal carbide |
| EXAMPLE (9) | metal boride + chromium carbide |
| EXAMPLE (10) | metal boride + $Cr_3C_2$ |
| EXAMPLE (11) | $TiB_2$ + metal carbide |
| EXAMPLE (12) | $TiB_2$ + chromium carbide |
| EXAMPLE (13) | $TiB_2$ + $Cr_3C_2$ |
| EXAMPLE (14-19) | C is added into each of the above-stated combinations in the examples (8) to (13). |

In these examples, M denotes a metal.

EXAMPLE (20)

Figure 7:
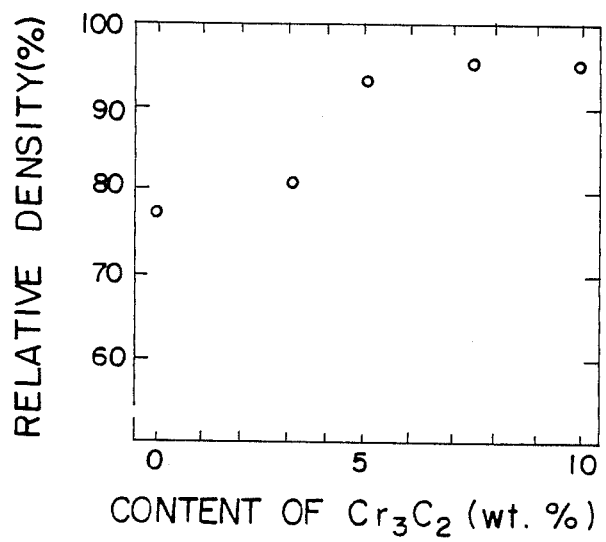
FIG. 7 is a graphic view showing the relationship between amount of addition of $Cr_3C_2$ and relative density.
Figure 8:
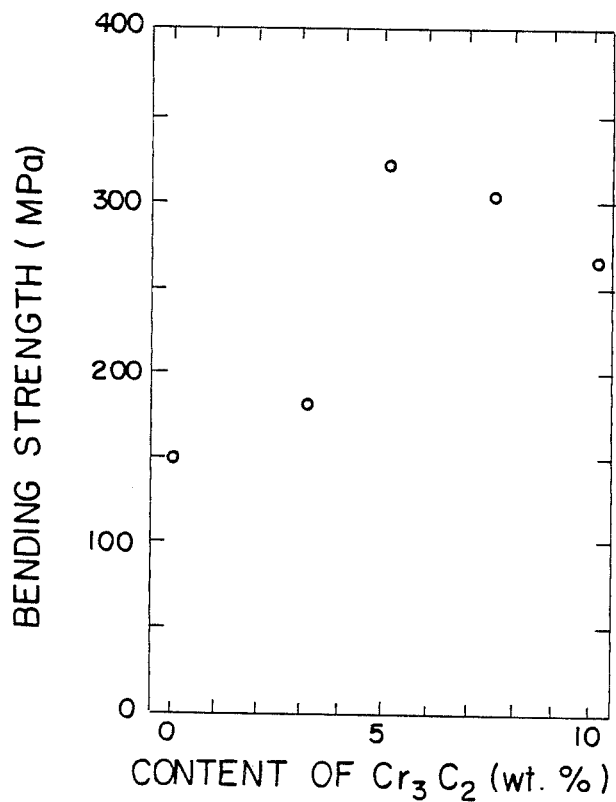
FIG. 8 is a graphic view showing the relationship between amount of $Cr_3C_2$ added and bending strength.

0-10 wt. % Chromium carbide was added to $TiB_2$ to thereby make a mixture. This mixture was shaped and fired by pressureless sintering at 1,900° C. for one hour within an Ar atmosphere. The experimental results are shown in Table 4 and FIGS. 7 and 8. It can be observed that the relative densities are high and the maximum bending strength is 321 MPa.

According to this invention, it is easy to manufacture a metal boride ceramic material having high density, high strength and high hardness.

TABLE 1

| No. | Composition (wt. %) | Firing Condition | Relative Density (%) | Bending Strength (MPa) |
|---|---|---|---|---|
| 1 | $TiB_2$ 100% | 1900° C. × 1 Hr, in Ar | 77 | 150 |
| 2 | $TiB_2$ 99% + C 1% | " | 71 | 109 |
| 3 | ($TiB_2$ 99% + C 1%) + Cr 3.5% | " | 98 | 175 |
| 4 | ($TiB_2$ 99% + C 1%) + Cr 7% | " | 98 | 246 |
| 5 | ($TiB_2$ 99% + C 1%) + Cr 10.5% | " | 98 | 376 |
| 6 | ($TiB_2$ 99% + C 1%) + Cr 14% | " | 96 | 265 |

TABLE 2

| No. | Composition (wt. %) | Firing Condition | Relative Density (%) | Bending Strength (MPa) |
|---|---|---|---|---|
| 1 | ($TiB_2$ 99% + C 1%) + Cr 7% | 1900° C. × 30 min, in Ar 30 MPa, in Ar | 100 | 406 |

TABLE 3

| No. | $TiB_2$ (wt. %) | Cr + C (wt. %) | wt. ratio of (Cr + C) | Firing Condition | Relative Density (%) | Bending Strength (MPa) |
|---|---|---|---|---|---|---|
| 4 | 95 | 5 | 7:0 | 1900° C. × 1 Hr, in Ar | 93 | 269 |

TABLE 3-continued

| No. | TiB$_2$ (wt. %) | Cr + C (wt. %) | wt. ratio of (Cr + C) | Firing Condition | Relative Density (%) | Bending Strength (MPa) |
|---|---|---|---|---|---|---|
| 5  | "    | "    | 7:1   | " | 96  | 315 |
| 6  | "    | "    | 7:1.5 | " | 97  | 386 |
| 7  | "    | "    | 7:2   | " | 99  | 355 |
| 8  | 92.5 | 7.5  | 7:0   | " | 93  | 329 |
| 9  | "    | "    | 7:1   | " | 100 | 331 |
| 10 | "    | "    | 7:1.5 | " | 100 | 398 |
| 11 | "    | "    | 7:2   | " | 100 | 368 |
| 12 | 90   | 10   | 7:0   | " | 93  | 275 |
| 13 | "    | "    | 7:1   | " | 99  | 171 |
| 14 | "    | "    | 7:1.5 | " | 100 | 332 |
| 15 | "    | "    | 7:2   | " | 100 | 316 |
| 16 | 87.5 | 12.5 | 7:0   | " | 93  | 272 |
| 17 | "    | "    | 7:1   | " | 94  | 316 |
| 18 | "    | "    | 7:1.5 | " | 96  | 274 |
| 19 | "    | "    | 7:2   | " | 97  | 343 |

TABLE 4

| Composition No. | (wt. %) | Density Firing Condition | Relative Strength (%) | Bending (MPa) |
|---|---|---|---|---|
| 1 | Ti B$_2$ 100% | 1900° C. × 1 Hr, in Ar | 77 | 150 |
| 2 | Ti B$^2$ 97% + Cr$_3$ C$_2$ 3% | " | 81 | 180 |
| 3 | Ti B$_2$ 95% + Cr$_3$ C$_2$ 5% | " | 93 | 321 |
| 4 | Ti B$_2$ 92.5% + Cr$_3$ C$_2$ 7.5% | " | 96 | 302 |
| 5 | Ti B$_2$ 90% + Cr$_3$ C$_2$ 10% | " | 96 | 267 |

We claim:

1. A method for manufacturing a metal boride ceramic material, comprising mixing metal boride powder with 1-20 wt. % metal powder and 0.1-10 wt. % carbon powder to thereby make a mixture, shaping the mixture and firing it.

2. The method of claim 1, wherein the metal boride is at least one member selected from the group consisting of TiB$_2$, ZrB$_2$, VB$_2$, NbB$_2$, TaB$_2$, MoB$_2$, MnB$_2$, HfB$_2$, AlB$_2$, Ti$_2$B, Ta$_2$B, Cr$_2$B, Mo$_2$B, W$_2$B, Cr$_3$B$_3$, Nb$_3$B$_2$, Ta$_3$B$_2$, TiB, NbB, TaB, CrB, MoB, WB, Nb$_3$B$_4$, Ta$_3$B$_4$, Cr$_3$B$_4$, Ti$_2$B$_5$, Mo$_2$B$_5$, W$_2$B$_5$, ZrB$_{12}$ and MoB$_{12}$.

3. The method of claim 1, wherein the metal boride is MB$_2$ wherein M denotes a metal.

4. The method of claim 1, wherein the metal boride is M$_2$B$_5$, M$_2$B, M$_5$B$_3$, M$_3$B$_2$, MB, M$_3$B$_4$, or MB$_{12}$, said metal boride converting to MB when heated to an elevated temperature, wherein M denotes a metal.

5. The method of claim 1, wherein the metal powder is at least one member selected from the group consisting of Cr, Ni, Ti, Mo, Si, Fe and Ta.

6. The method of claim 1, wherein the mixture is fired by pressureless sintering.

7. The method of claim 1, wherein the mixture is fired by pressure sintering.

8. A method for manufacturing a metal boride ceramic material, comprising mixing metal boride powder with 0.1-89 wt. % metal carbide powder to thereby make a mixture consisting essentially of said metal boride powder and said metal carbide powder, shaping said mixture and firing it.

9. The method of claim 8, wherein the metal boride is at least one member selected from a group consisting of TiB$_2$, ZrB$_2$, VB$_2$, NbB$_2$, TaB$_2$, MoB$_2$, MnB$_2$, HfB$_2$, AlB$_2$, Ti$_2$B, Ta$_2$B, Cr$_2$B, Mo$_2$B, W$_2$B, Cr$_3$B$_3$, Nb$_3$B$_2$, Ta$_3$B$_2$, TiB, NbB, TaB, CrB, MoB, WB, Nb$_3$B$_4$, Ta$_3$B$_4$, Cr$_3$B$_4$, Ti$_2$B$_5$, Mo$_2$B$_5$, W$_2$B$_5$, ZrB$_{12}$ and MoB$_{12}$.

10. The method of claim 8, wherein the metal boride is MB$_2$ wherein M denotes a metal.

11. The method of claim 8, wherein the metal boride is M$_2$B$_5$, M$_2$B, M$_5$B$_3$, M$_3$B$_2$, MB, M$_3$B$_4$ or MB$_{12}$, said metal boride converting to MB upon being heated to an elevated temperature.

12. The method of claim 8, wherein the metal of the metal carbide powder is one or more members selected from elements of the 3, 4a, 5a, 6a and 8 groups of the periodic table.

13. The method of claim 8, wherein the metal carbide powder is chromium carbide.

14. The method of claim 8, wherein the metal carbide powder is molybdenum carbide.

15. The method of claim 8, wherein the metal carbide powder is tungsten carbide.

16. The method of claim 8, wherein the mixture is fired by pressureless sintering.

17. The method of claim 8, wherein the mixture is fired by pressure sintering.

18. A method for manufacturing a metal boride ceramic material, comprising shaping a mixture consisting essentially of 0.1-89 wt. % metal carbide powder and 99.9-11 wt. % metal boride powder to thereby make a shaped body and thereafter firing the shaped body, wherein the metal boride powder is selected from the group consisting of chromium carbide, molybdenum carbide, tungsten carbide, nickel carbide and iron carbide.

19. The method of claim 18 wherein said firing is to be temperature sufficient to decompose said metal carbide into metal and carbon, thereby freeing carbon for reaction with said metal boride.

20. The method of claim 18 wherein said firing is to a temperature sufficient to decompose said metal carbide into metal and carbon, thereby freeing carbon for reaction with said metal boride.

* * * * *

UNITED STATES PATENT AND TRADEMARK OFFICE
CERTIFICATE OF CORRECTION

PATENT NO. : 4,873,053
DATED : October 10, 1989
INVENTOR(S) : MATSUSHITA et al

PAGE 1 OF 2

It is certified that error appears in the above-identified patent and that said Letters Patent is hereby corrected as shown below:

ON THE TITLE PAGE,
IN THE ABSTRACT:

Line 6, after "powder" insert --to--.

Col. 1, line 40, after "volume" insert a comma --,--;

line 62, after "powder" delete "mixture" and after "the", first instance, insert --mixture--; and line 66, "convert" should read --converts--.

Col. 2, line 7, "preferably" should read --preferable--;

line 33, "improve" should read --improves--; and line 54, after "in" insert --the--.

Col. 3, line 19, after "$TiB_2$" insert a period --.--; and line 57, "angle" should read --angles--.

UNITED STATES PATENT AND TRADEMARK OFFICE
CERTIFICATE OF CORRECTION

PATENT NO. : 4,873,053

DATED : October 10, 1989

INVENTOR(S) : MATSUSHITA et al

It is certified that error appears in the above-identified patent and that said Letters Patent is hereby corrected as shown below:

Col. 4, line 3, " : $TiB_2$" should read --○ : $TiB_2$--;

line 4, " : $TiB_2$" should read --● : $TiB_2$--;

line 5, " : $TiB_2$" should read --◐ : $TiB_2$--; and line 6, " : $TiB_2$" should read --◐ : $TiB_2$--.

Col. 6, line 56, "18" should read --8--; and line 57, "be" should read --a--.

Signed and Sealed this

Twenty-sixth Day of November, 1991

*Attest:*

HARRY F. MANBECK, JR.

*Attesting Officer*      *Commissioner of Patents and Trademarks*